US008333406B2

(12) United States Patent
Slaats

(10) Patent No.: US 8,333,406 B2
(45) Date of Patent: Dec. 18, 2012

(54) METHOD AND SYSTEM FOR MULTI-STAGE INFLATION OF A CURTAIN AIRBAG FOR EJECTION MITIGATION

(75) Inventor: Paul M. Slaats, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 128 days.

(21) Appl. No.: 12/899,505

(22) Filed: Oct. 6, 2010

(65) Prior Publication Data

US 2012/0086190 A1 Apr. 12, 2012

(51) Int. Cl.
*B60R 21/263* (2011.01)
(52) U.S. Cl. ...... 280/736; 280/741; 280/742; 280/730.2
(58) Field of Classification Search ............... 280/730.2, 280/736, 742, 741
See application file for complete search history.

(56) References Cited

U.S. PATENT DOCUMENTS

| | | | |
|---|---|---|---|
| 5,620,202 A | 4/1997 | Gray et al. | |
| 5,842,718 A | 12/1998 | Byon | |
| 5,967,550 A | 10/1999 | Shirk et al. | |
| 5,997,033 A | 12/1999 | Gray et al. | |
| 6,142,518 A | 11/2000 | Butt et al. | |
| 6,206,416 B1 | 3/2001 | Faigle et al. | |
| 6,209,908 B1 * | 4/2001 | Zumpano | 280/729 |
| 6,218,738 B1 | 4/2001 | Fujishima | |
| 6,241,279 B1 * | 6/2001 | Ochiai | 280/735 |
| 6,254,129 B1 | 7/2001 | Rink et al. | |
| 6,279,948 B1 | 8/2001 | Rank | |
| 6,341,252 B1 | 1/2002 | Foo et al. | |
| 6,386,581 B1 * | 5/2002 | Ohno | 280/735 |
| 6,428,041 B1 * | 8/2002 | Wohllebe et al. | 280/736 |
| 6,513,829 B1 * | 2/2003 | Zumpano | 280/730.1 |
| 6,698,791 B1 * | 3/2004 | Furui | 280/735 |
| 6,789,820 B2 * | 9/2004 | Meduvsky et al. | 280/742 |
| 6,883,631 B2 * | 4/2005 | Hu et al. | 180/274 |
| 7,004,500 B2 * | 2/2006 | Dinsdale et al. | 280/737 |
| 7,036,845 B2 | 5/2006 | Bentele-Calvoer et al. | |
| 7,128,335 B2 * | 10/2006 | Hasebe et al. | 280/731 |
| 7,293,798 B2 * | 11/2007 | Burns et al. | 280/741 |
| 7,331,603 B2 * | 2/2008 | Hasebe et al. | 280/731 |
| 7,441,802 B2 * | 10/2008 | Yamaji et al. | 280/739 |
| 7,559,564 B2 * | 7/2009 | Takimoto | 280/274 |

(Continued)

FOREIGN PATENT DOCUMENTS

DE 10019894 4/2001

*Primary Examiner* — Nicole Verley
(74) *Attorney, Agent, or Firm* — Snell & Wilmer LLP

(57) ABSTRACT

The present invention can include an automobile having a multi-stage inflation system. The multi-stage inflation system can include an engine control unit, a multi-stage inflation unit, a curtain airbag, a curtain airbag pressure indicator, and/or a rollover side impact detection unit. The rollover side impact detection unit can detect when a side impact or a rollover occurs to the automobile. When the rollover or the side impact is detected, the engine control unit can instruct the multi-stage inflation unit to deploy and inflate the curtain airbag in multiple stages. The multi-stage inflation unit can include a pyrotechnic inflation unit with multiple compartments. At each of the stages, a different one of the multiple compartments can be activated to substantially inflate the curtain airbag. The multi-stage inflation unit can also optionally include a cold gas inflation unit to supplement the pyrotechnic inflation unit.

17 Claims, 5 Drawing Sheets

U.S. PATENT DOCUMENTS

| | | | |
|---|---|---|---|
| 7,581,750 B2* | 9/2009 | Hirata et al. | 280/730.1 |
| 7,584,993 B2* | 9/2009 | Yamaji et al. | 280/736 |
| 7,600,780 B2* | 10/2009 | Tobata et al. | 280/733 |
| 8,047,569 B2* | 11/2011 | Cox et al. | 280/736 |
| 8,128,123 B2* | 3/2012 | Johanson et al. | 280/737 |
| 2003/0146611 A1* | 8/2003 | Kenney et al. | 280/736 |
| 2004/0051288 A1* | 3/2004 | Karray et al. | 280/741 |
| 2004/0100076 A1 | 5/2004 | Holtz | |
| 2005/0161922 A1* | 7/2005 | Bilbrey et al. | 280/736 |
| 2005/0173897 A1* | 8/2005 | Abe et al. | 280/729 |
| 2006/0097491 A1* | 5/2006 | Saberan et al. | 280/730.1 |
| 2006/0202452 A1* | 9/2006 | Breed et al. | 280/730.2 |
| 2006/0267322 A1* | 11/2006 | Eckelberg | 280/736 |
| 2008/0054602 A1* | 3/2008 | Yang | 280/729 |
| 2008/0243342 A1* | 10/2008 | Breed | 701/45 |
| 2008/0269993 A1 | 10/2008 | Simpson et al. | |
| 2009/0174174 A1 | 7/2009 | McCoy | |
| 2010/0083863 A1 | 4/2010 | Humbert et al. | |
| 2010/0264632 A1* | 10/2010 | Bacher et al. | 280/735 |
| 2011/0025030 A1* | 2/2011 | Mendenhall et al. | 280/741 |
| 2011/0309605 A1* | 12/2011 | Kumagai | 280/741 |

* cited by examiner

METHOD AND SYSTEM FOR MULTI-STAGE INFLATION OF A CURTAIN AIRBAG FOR EJECTION MITIGATION

BACKGROUND

1. Field

The present invention relates to a method and system for a multi-stage inflation of a curtain airbag for ejection mitigation.

2. Description of the Related Art

A conventional automobile may include a curtain airbag which can be inflated during a side impact or a rollover. The inflation of the curtain airbag is designed to reduce a likelihood of injury to the user of the automobile, such as to reduce the likelihood that the user will be ejected from the automobile, and/or to reduce the likelihood that the user will impact a hard object. To inflate the curtain airbag, the conventional automobile can use a conventional cold gas inflation unit. During a side impact or a rollover, the conventional cold gas inflation unit can inflate the curtain airbag by deploying compressed air from a canister. However, such canisters are often heavy and expensive, which can reduce efficiencies of the automobile and also increase the manufacturing costs of the automobile.

In addition, government agencies may require that the curtain airbag be inflated at a certain pressure at certain time periods. However, with the conventional cold gas inflation unit, the pressure in the curtain airbag increases to a climax and then slowly decreases. This may provide inadequate pressure to meet the requirements of the governmental agencies.

A conventional pyrotechnic inflation unit has also been used for airbags, since it is generally lighter and has a reduced cost. However, a conventional pyrotechnic inflation unit is also inadequate because it may provide a quick burst of pressure, but it does not adequately maintain the pressure of the curtain airbag by itself. The inflation of the curtain airbag using the pyrotechnic inflation unit, therefore, may be unable to meet the requirements of the governmental agencies.

Thus, there is a need for a method and system for a multi-stage inflation of a curtain airbag for ejection mitigation.

SUMMARY

The present invention relates to a method and system for a multi-stage inflation of a curtain airbag for ejection mitigation. The present invention can include an automobile having a multi-stage inflation system. The multi-stage inflation system can include an engine control unit, a multi-stage inflation unit, a curtain airbag, a curtain airbag pressure indicator, and/or a rollover side impact detection unit. The rollover side impact detection unit can detect when a side impact or a rollover occurs to the automobile. When the rollover or the side impact is detected, the engine control unit can instruct the multi-stage inflation unit to deploy. The multi-stage inflation unit can inflate the curtain airbag in multiple stages. At the initial stage, the curtain airbag is inflated, and when the curtain airbag pressure indicator indicates that the pressure of the airbag is below a predetermined pressure threshold, the multi-stage inflation unit can inflate the curtain airbag again at another stage.

The multi-stage inflation unit can include a pyrotechnic inflation unit with multiple compartments. At each of the stages, a different one of the multiple compartments can be activated to inflate the curtain airbag. The multi-stage inflation unit can also optionally include a cold gas inflation unit to supplement the pyrotechnic inflation unit.

The inflation of the curtain airbag in multiple stages ensures that the curtain airbag is substantially inflated at certain pressures at critical moments of the side impact or the rollover, such as when the automobile is first impacted or commences a rollover, when the automobile is on its side, and/or when the automobile is upside down. In addition, the use of the pyrotechnic inflation unit allows for an efficient and inexpensive inflation unit to be used to inflate the curtain airbag. The light weight construction of the pyrotechnic inflation unit can also reduce a size of the multi-stage inflation unit allowing the automobile to be more fuel efficient. The use of the pyrotechnic inflation unit also allows for the use of a cold gas inflation unit with a reduced size, which again, can improve fuel efficiency of the automobile.

In one embodiment, the present invention is a multi-stage inflation system for ejection mitigation including a curtain airbag configured to be inflated, a multi-stage inflation unit configured to inflate the curtain airbag at multiple stages, wherein in each stage, the curtain airbag is substantially inflated, and an electronic control unit connected to the multi-stage inflation unit and configured to control the multi-stage inflation unit to inflate the curtain airbag at multiple stages.

In another embodiment, the present invention is an automobile including a multi-stage inflation system for ejection mitigation including a curtain airbag configured to be inflated, a pyrotechnic inflation unit configured to inflate the curtain airbag at multiple stages, wherein the pyrotechnic inflation unit includes multiple compartments, and one of the compartments is activated at each of the multiple stages, and an electronic control unit connected to the pyrotechnic inflation unit and configured to control the pyrotechnic inflation unit to inflate the curtain airbag at multiple stages.

In yet another embodiment, the present invention is a method for inflating a curtain airbag in an automobile using a pyrotechnic inflation unit including detecting a rollover or a side impact to the automobile, inflating the curtain airbag in multiple stages using the pyrotechnic inflation unit, and substantially inflating the curtain airbag in each of the multiple stages.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
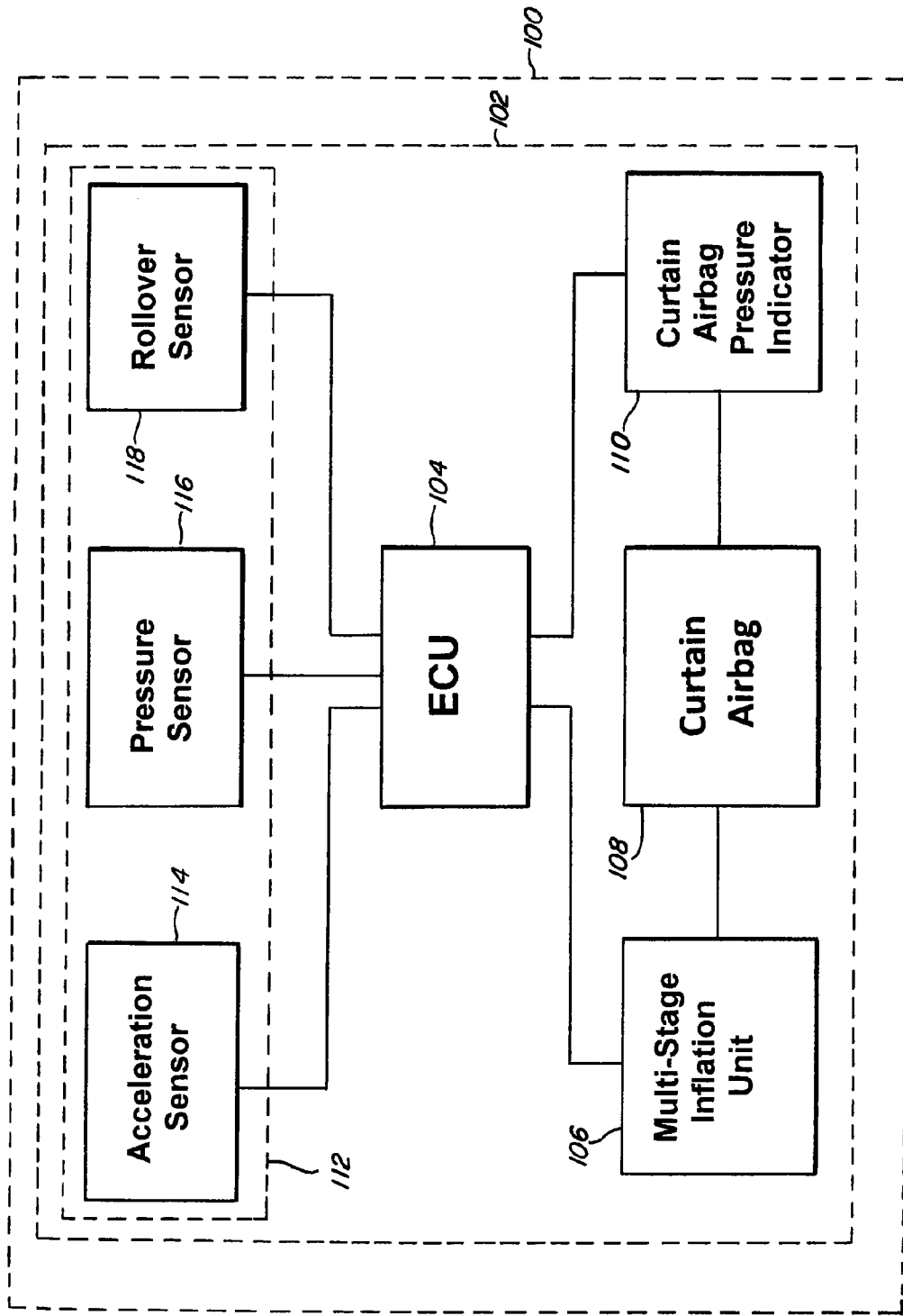
FIG. 1 depicts an automobile including a multi-stage inflation system according to an embodiment of the present invention.

In one embodiment, the present invention includes an automobile 100 as shown in FIG. 1. The automobile 100 can include a multi-stage inflation system 102, which can include an engine control unit ("ECU") 104, a multi-stage inflation unit 106, a curtain airbag 108, a curtain airbag pressure indicator 110, and a rollover side impact detection unit 112.

The rollover side impact detection unit 112 is connected, for example, to the ECU 104. The rollover side impact detection unit 112 can detect, for example, when a rollover or a side impact occurs to the automobile 100. The rollover side impact detection unit 112 can include, for example, an acceleration sensor 114, a pressure sensor 116, and/or a rollover sensor 118, each of which can be connected to the ECU 104.

The acceleration sensor 114 can detect, for example, a change in acceleration in the automobile 100 which can indicate a side impact. The pressure sensor 116 can be located in a side door of the automobile 100 and detect, for example, when the side door is impacted indicating a side impact to the automobile 100. The rollover sensor 118 can be, for example, a gyroscope and can be used to indicate when the rollover to the automobile 100 occurs.

The curtain airbag 108 is connected, for example, to the ECU 104. The curtain airbag 108 can be deployed for ejection mitigation of users within the automobile 100. That is, the curtain airbag 108 can reduce the likelihood that users in the automobile 100 will be ejected from the automobile 100. In addition, the curtain airbag 108 can also provide a cushioning for the users of the automobile 100 to reduce or prevent injuries suffered by the user.

The curtain airbag pressure indicator 110 is connected, for example, to the ECU 104 and the curtain airbag 108. The curtain airbag pressure indicator 110 can detect, for example, curtain airbag data. The curtain airbag data can indicate a pressure in the curtain airbag 108. The curtain airbag pressure indicator 110 can be located inside the curtain airbag 108, and/or adjacent the curtain airbag 108.

The multi-stage inflation unit 106 is connected, for example, to the ECU 104 and the curtain airbag 108. The multi-stage inflation unit 106 can be, for example, a pyrotechnic inflation unit, which can inflate in multiple stages. The pyrotechnic inflation unit can include, for example, multiple compartments. One of the multiple compartments can be activated at each of the multiple stages. This can ensure, for example, that the pressure in the curtain airbag 108 is sufficient through critical moments when a side impact or rollover occurs in the automobile 100.

Figure 2:
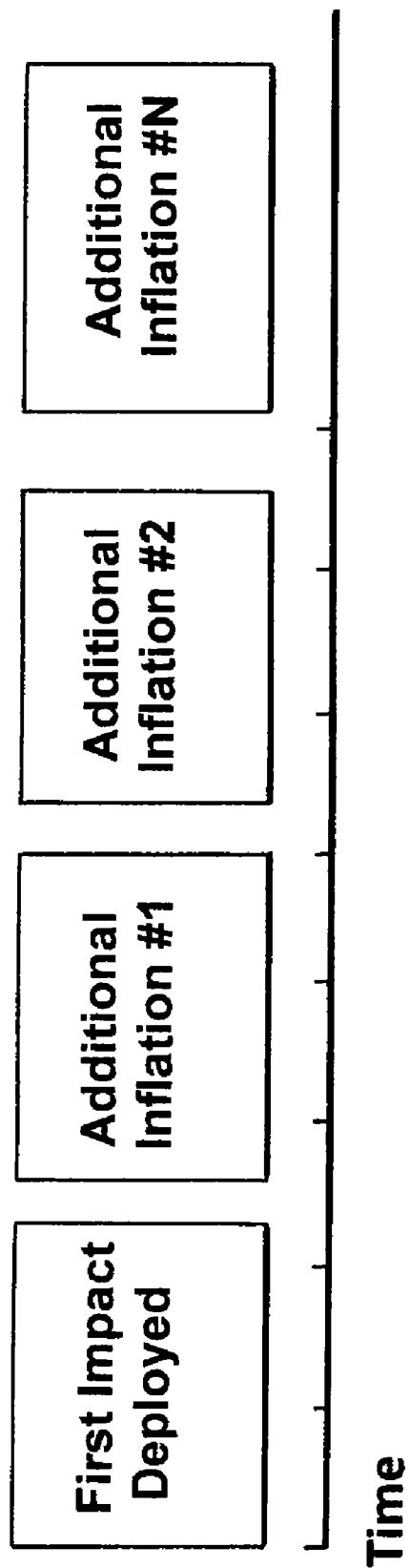
FIG. 2 depicts a timeline for inflation of a curtain airbag by a multi-inflation unit according to an embodiment of the present invention.

In one embodiment, the pyrotechnic inflation unit can have at least three compartments and thus can inflate the curtain airbag 108 in at least three stages. For example, as seen in FIG. 2, at the first stage (first impact of the automobile 100), a first compartment can be activated to deploy and inflate the curtain airbag 108. At a second stage at a second time period, a second compartment can be activated to provide additional inflation to the curtain airbag 108 to increase the pressure in the curtain airbag 108. At a third stage at a third time period, a third compartment can be activated to provide additional inflation to the curtain airbag 108. Additional inflations can also be provided as necessary depending on the number of compartments in the pyrotechnic inflation unit.

Figure 3:
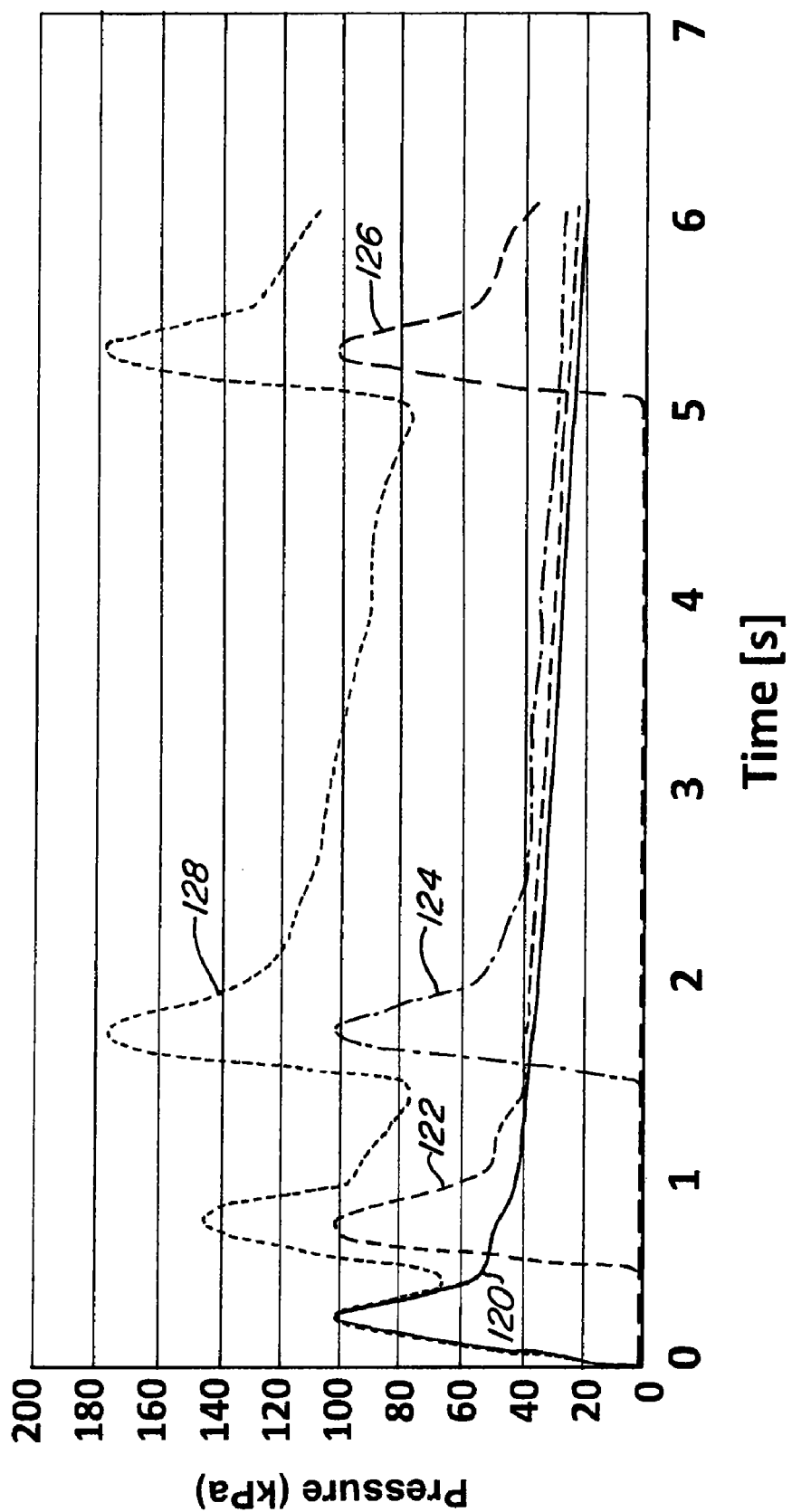
FIG. 3 depicts a graph indicating curtain airbag pressure according to an embodiment of the present invention.

The pressure of the curtain airbag 108 using the pyrotechnic inflation unit can be seen, for example, in FIG. 3. In FIG. 3, the curve 120 represents the pressure supplied by the first compartment at the first stage, the curve 122 represents the pressure supplied by the second compartment at the second stage, the curve 124 represents the pressure supplied by the third compartment at the third stage, and the curve 126 represents the pressure supplied by the fourth compartment at the fourth stage. The curve 128 represents the pressure of the curtain airbag 108 due to the multiple compartments in the pyrotechnic inflation unit. As can be seen in FIG. 3, the curve 128 is periodically increased due to the activation of different compartments of the pyrotechnic inflation unit at different times. Thus, by using the pyrotechnic inflation unit of the present invention instead of the conventional pyrotechnic inflation unit, the pressure of the curtain airbag can be maintained at a higher level.

In one embodiment, the pyrotechnic inflation unit can inflate at three stages. The three stages can be at the time of the side impact or the rollover, 1.5 seconds after the time of the side impact or the rollover, and/or 6 seconds after the time of the side impact or the rollover. However, it is understood that the pyrotechnic inflation unit can inflate at any number of stages at any number of time periods depending on, for example, government regulations, manufacture regulations, and/or other requirements.

In another embodiment, the multi-stage inflation unit 106 can also be a hybrid inflation unit including both a cold gas inflation unit and a pyrotechnic inflation unit. In such a configuration, the hybrid inflation unit can inflate the curtain airbag in at least two stages. For example, one or more stages can be from the pyrotechnic inflation unit and one or more stages can be from the cold gas inflation unit. The order of the stages can be varied. For example, in one embodiment, a first stage can be from the pyrotechnic inflation unit and the second stage can be from the cold gas inflation unit. In another embodiment, a first stage can be from the cold gas inflation unit and the second stage can be from the pyrotechnic inflation unit. In addition, the number of stages can be varied. For example, in one embodiment, the pyrotechnic unit in the hybrid inflation unit can inflate the curtain airbag in at least two stages, after an initial inflation of the curtain airbag by the cold gas inflation unit.

Figure 4:
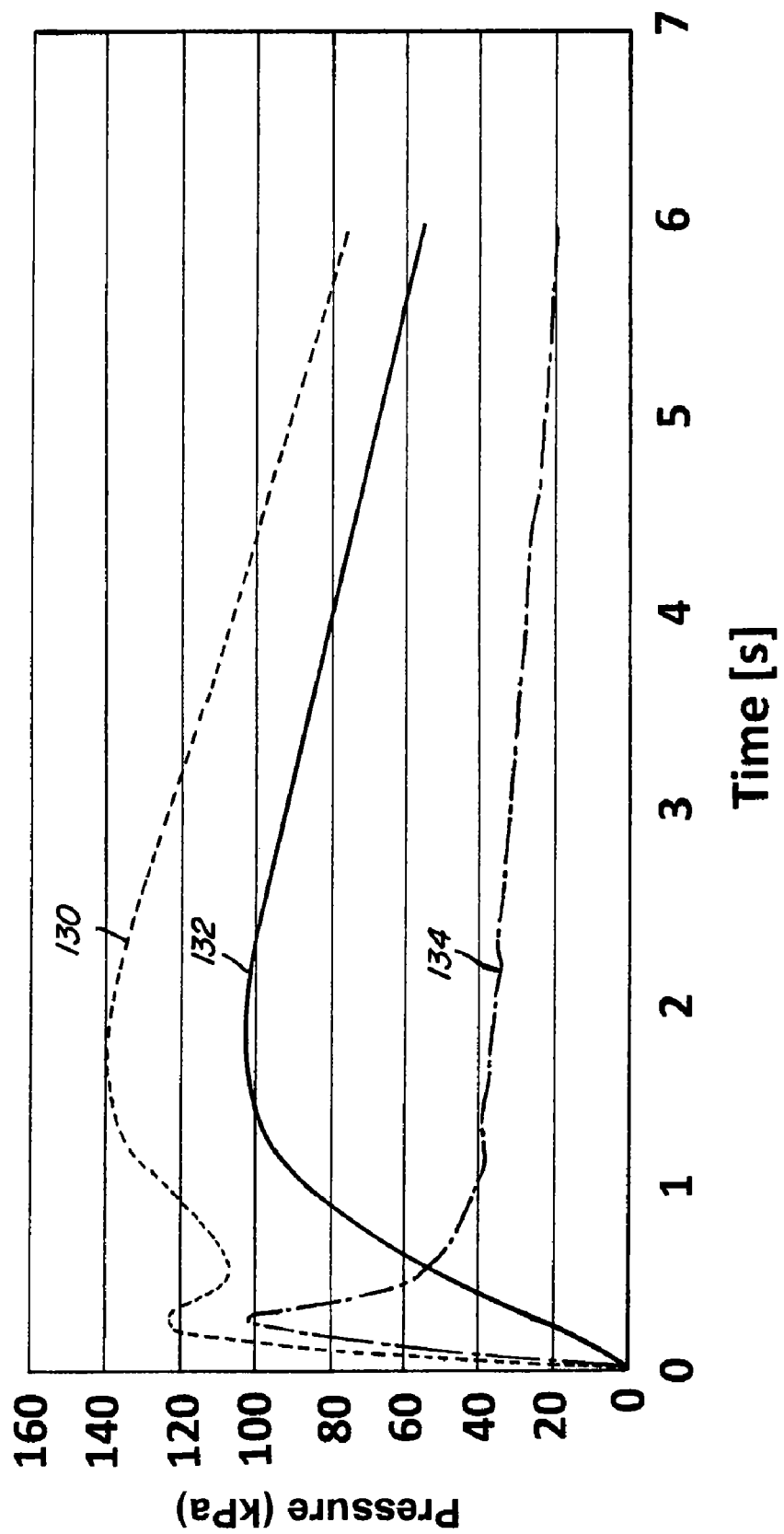
FIG. 4 depicts a graph indicating curtain airbag pressure according to an embodiment of the present invention.

The pressure of the curtain airbag 108 when inflated by the hybrid inflation unit, a conventional cold gas inflation unit, and a conventional pyrotechnic inflation unit can be seen in FIG. 4. The curve 130 represents the pressure of the curtain airbag 108 using the hybrid inflation unit, while the curve 132 represents the pressure of the curtain airbag 108 using the conventional cold gas inflation unit, and the curve 134 represents the pressure of the curtain airbag 108 using the conventional pyrotechnic inflation unit. As can be seen, using the hybrid inflation unit, the pressure of the curtain airbag 108 is maintained at a higher level for a longer period of time.

Although a conventional pyrotechnic unit with a single compartment is shown in FIG. 4, the pyrotechnic unit of the present invention with multiple compartments may also be used to provide additional stages and additionally inflate the curtain airbag 108 at subsequent time periods. Again, this can increase the pressure of the curtain airbag 108 at critical moments.

Figure 5:
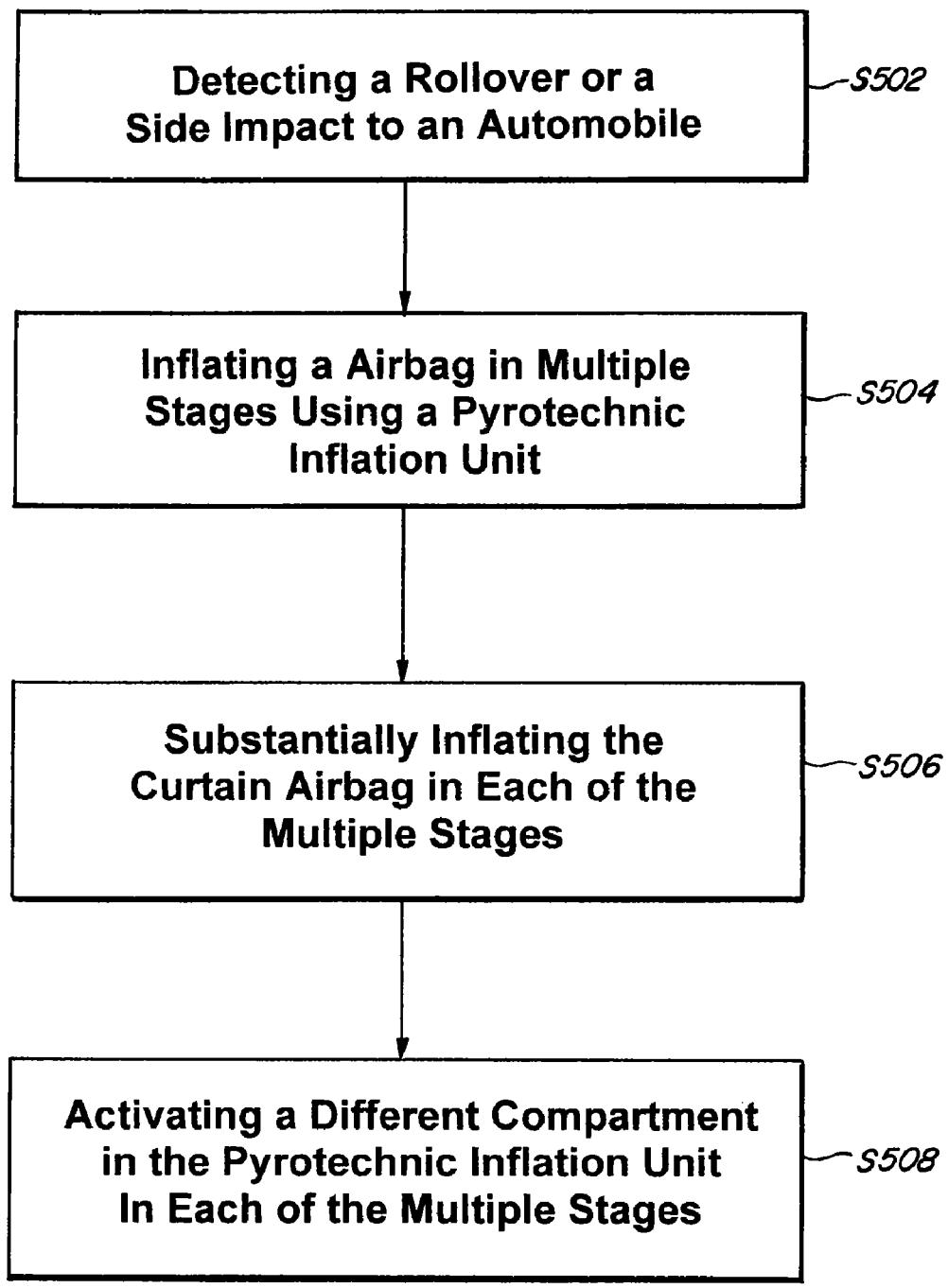
FIG. 5 depicts a process according to an embodiment of the present invention.

In one embodiment, the present invention can be, for example, a process as shown in FIG. 5. In Step S502, a rollover or a side impact to an automobile is detected. For example, the rollover side impact detection unit 112 can detect when a rollover or a side impact has occurred. In Step S504, a curtain airbag is inflated in multiple stages using a pyrotechnic inflation unit. For example, the curtain airbag 108 can be inflated by the multi-stage inflation unit 106 when, for example, the multi-stage inflation unit 106 is a pyrotechnic unit with multiple compartments.

In Step S506, the curtain airbag is substantially inflated in each of the multiple stages. For example, the curtain airbag 108 is substantially inflated in each of the multiple stages. In Step S508, a different compartment in the pyrotechnic inflation unit is activated in each of the multiple stages. For example, one of the different compartments in the pyrotechnic inflation unit is activated in each of the multiple stages when the multi-stage inflation unit 106 is a pyrotechnic inflation unit. In addition, the cold gas inflation unit can also be used in one or more of the above steps to supplement the inflation of the curtain airbag by the pyrotechnic inflation unit.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A multi-stage inflation system for ejection mitigation comprising:
    an airbag configured to be inflated;
    a multi-stage inflation unit configured to inflate the airbag in sequential stages, wherein the airbag is substantially inflated at each of the sequential stages;
    a processor connected to the multi-stage inflation unit and configured to control the multi-stage inflation unit to inflate the airbag in the sequential stages; and
    an airbag pressure indicator connected to the processor, and configured to detect airbag data corresponding to a pressure of the airbag,
    wherein the processor controls the sequential stage inflation of the airbag by the multi-stage inflation unit based on the airbag data.

2. The system of claim 1 wherein the multi-stage inflation unit includes multiple compartments, wherein one of the compartments is activated at each of the sequential stages.

3. The system of claim 1 wherein the multi-stage inflation unit is a pyrotechnic inflation unit configured to inflate the airbag in at least three stages, and the processor controls the pyrotechnic inflation unit to inflate the airbag in the at least three stages.

4. The system of claim 1 wherein the multi-stage inflation unit is a hybrid inflation unit including a pyrotechnic inflation unit connected to the airbag, and a stored gas unit connected to the airbag, wherein the hybrid inflation unit is configured to inflate the airbag in at least two stages, and the processor controls the hybrid inflation unit to inflate the airbag in the at least two stages.

5. The system of claim 1 further comprising a rollover side impact detection unit connected to the processor, and configured to detect when a rollover or a side impact occurs.

6. The system of claim 5 wherein the processor controls the multi-stage inflation unit to inflate the airbag when the rollover side impact detection unit detects that the rollover or the side impact has occurred.

7. The system of claim 6 wherein the rollover side impact detection unit is an acceleration sensor, a pressure sensor, or a rollover sensor.

8. An automobile comprising:
    a multi-stage inflation sytem for ejection mitigation including:
        an airbag configured to be inflated,
        a pyrotechnic inflation unit configured to inflate the airbag in sequential stages, wherein the pyrotechnic inflation unit includes multiple compartments, and one of the compartments is activated at each of the sequential stages to periodically increase pressure of the airbag,
        a processor connected to the pyrotechnic inflation unit and configured to control the pyrotechnic inflation unit to inflate the airbag in the sequential stages, and
        an airbag pressure indicator connected to the processor, and configured to detect airbag data corresponding to a pressure of the airbag, wherein the processor controls the multiple stage inflation of the airbag by the pyrotechnic inflation unit based on the airbag data.

9. The automobile of claim 8 wherein the pyrotechnic inflation unit is configured to inflate the airbag in at least three stages, and the processor controls the pyrotechnic inflation unit to inflate the airbag in the at least three stages.

10. The automobile of claim 8 wherein the airbag is substantially inflated at each of the sequential stages.

11. The automobile of claim 8 wherein the multi-stage inflation system further comprises a rollover side impact detection unit connected to the processor, and configured to detect when a rollover or a side impact to the automobile has occurred, wherein the processor controls the pyrotechnic inflation unit to inflate the airbag when the rollover side impact detection unit detects that the rollover or the side impact to the automobile has occurred.

12. The automobile of claim 11 wherein the rollover side impact detection unit is an acceleration sensor, a pressure sensor, or a rollover sensor.

13. A method for inflating an airbag in an automobile comprising:
    detecting, using a sensor, a rollover or a side impact to the automobile;
    detecting, using a pressure indicator, airbag data corresponding to an internal pressure of the airbag; and
    using a pyrotechnic inflation unit, substantially inflating the airbag in multiple stages based on the airbag data.

14. The method of claim 13 wherein the multiple stages includes at least three stages.

15. The method of claim 13 further comprising activating a different compartment in the pyrotechnic inflation unit in each of the multiple stages.

16. The method of claim 13 wherein the sensor is an acceleration sensor, a pressure sensor, or a rollover sensor.

17. The method of claim 13 wherein the pyrotechnic inflation unit includes multiple compartments, wherein one of the compartments is activated at each of the multiple stages.

* * * * *